(12) United States Patent
Chen et al.

(10) Patent No.: US 12,337,466 B2
(45) Date of Patent: Jun. 24, 2025

(54) MODULAR ROBOT JOINT, ENCODER READING HEAD POSITION ADJUSTMENT MECHANISM AND METHOD FOR ADJUSTING THE POSITION OF AN ENCODER READING HEAD

(71) Applicants: AGILE ROBOTS SE, Munich (DE); Beijing Siling Robot Technology Co., Ltd., Beijing (CN)

(72) Inventors: Zhaopeng Chen, Beijing (CN); Zhimin Gao, Beijing (CN); Yuechao Zhao, Beijing (CN); Xuebin Su, Beijing (CN); Qian Wang, Beijing (CN)

(73) Assignees: Agile Robots SE, Munich (DE); Beijing Siling Robot Technology Co., Ltd., Beijing (CN)

( * ) Notice: Subject to any disclaimer, the term of this patent is extended or adjusted under 35 U.S.C. 154(b) by 22 days.

(21) Appl. No.: 17/780,630

(22) PCT Filed: Nov. 17, 2020

(86) PCT No.: PCT/EP2020/082435
§ 371 (c)(1),
(2) Date: May 27, 2022

(87) PCT Pub. No.: WO2021/104950
PCT Pub. Date: Jun. 3, 2021

(65) Prior Publication Data
US 2023/0356408 A1    Nov. 9, 2023

(30) Foreign Application Priority Data

Nov. 30, 2019   (CN) .......................... 201911208255.6

(51) Int. Cl.
*B25J 13/08* (2006.01)
*B25J 9/10* (2006.01)
(Continued)

(52) U.S. Cl.
CPC ............. *B25J 13/088* (2013.01); *B25J 9/102* (2013.01); *B25J 9/126* (2013.01); *B25J 17/0241* (2013.01);
(Continued)

(58) Field of Classification Search
CPC ..... B25J 13/088; H02K 11/215; H02K 7/116; H02K 2213/09
See application file for complete search history.

(56) References Cited

U.S. PATENT DOCUMENTS

2020/0235636 A1* 7/2020 Miyazawa ............... B25J 9/102

FOREIGN PATENT DOCUMENTS

| CN | 107718036 A | 2/2018 |
|---|---|---|
| CN | 207439426 U | 6/2018 |

(Continued)

OTHER PUBLICATIONS

Written Opinion for application No. PCT/EP2020/082435 dated Jun. 3, 2021.
(Continued)

*Primary Examiner* — Victor L MacArthur
*Assistant Examiner* — Gregory T Prather
(74) *Attorney, Agent, or Firm* — Carter, DeLuca & Farrell LLP

(57) ABSTRACT

The invention discloses a modular robot joint, encoder reading head position adjustment mechanism and method for adjusting the position of an encoder reading head, the encoder reading head position adjustment mechanism is disposed on one side of the encoder reading head bracket, and includes a lower support and a upper support, the lower support and the upper support are connected to each other and positioned by a positioning connecting member, the upper support is pressed tightly against the lower support by a pressing connecting member, the encoder reading head is
(Continued)

fixed to the upper surface of the upper support and is opposite to the encoder magnetic ring, the encoder magnetic ring is fixed to the motor shaft or the hollow shaft, the distance between the lower support and the upper support can be adjusted by adjusting the pressing connecting member and positioning connecting member, so that the axial distance between the reading head and the magnetic ring can be adjusted to a predetermined value, the processing accuracy of related parts on the dimensional chain is reasonably reduced, and the processing cost is reduced too, and the relative distance between the reading head and the magnetic ring is easy to adjust when the robot joint is assembled and debugged, thus achieving good technical results.

2 Claims, 4 Drawing Sheets

(51) Int. Cl.
| | | |
|---|---|---|
| *B25J 9/12* | (2006.01) | |
| *B25J 17/02* | (2006.01) | |
| *H02K 7/102* | (2006.01) | |
| *H02K 7/116* | (2006.01) | |
| *H02K 11/215* | (2016.01) | |

(52) U.S. Cl.
CPC ............. *H02K 7/102* (2013.01); *H02K 7/116* (2013.01); *H02K 11/215* (2016.01); *H02K 2213/09* (2013.01); *H02K 2213/12* (2013.01)

(56) References Cited

FOREIGN PATENT DOCUMENTS

| | | | |
|---|---|---|---|
| CN | 211761642 | * | 10/2020 |
| JP | 62-132238 | A | 3/1964 |
| JP | 2007228751 | A | 9/2007 |
| JP | 2017123731 | A | 7/2017 |
| KR | 20110009970 | A | 1/2011 |
| KR | 20160132149 | A | 11/2016 |
| WO | 2018159032 | A1 | 9/2018 |

OTHER PUBLICATIONS

International Search Report for appliction No. PCT/EP2020/082435 dated Jun. 3, 2021.
Chinese Office Action for application No. 201911208255.6 dated Nov. 3, 2020.
First Office Action DE2022-5320 dated May 19, 2020; 13 pages.

* cited by examiner

MODULAR ROBOT JOINT, ENCODER READING HEAD POSITION ADJUSTMENT MECHANISM AND METHOD FOR ADJUSTING THE POSITION OF AN ENCODER READING HEAD

FIELD OF THE INVENTION

The invention relates to the field of robot, in particular to a modular robot joint and a specific structure inside the same.

BACKGROUND OF THE INVENTION

The compactness and miniaturization of the modular robot joints of collaborative robots are an important development direction, and it is directly related to the parameters of the whole machine. The stability and accuracy of the modular joints' operation is importance to the performance of the robotic arm. In the prior art, most of the modular joints use frameless motors in a compact structural space, and use high-speed shaft and low-speed shaft encoders to read the rotation speed of the motor and the joint output shaft, so as to use the information to control the joint. Generally, A precise installation distance between the detection surface of the encoder reading head and the surface of the encoder magnetic ring is required. In some encoder manuals, the error between the actual installation distance and the theoretical installation distance is ≤0.5 mm.

The prior art CN207548790U discloses a driving device and a robot, CN109715348A discloses a driving unit for a manipulator, whose robot modular joints include a driving sensor device 18 and a driven sensor device 22 which are provided on the circuit board 13, the circuit board 13 is fixed on the cover 11 through the studs 12, A sensor ring 17 corresponding to the drive sensor device 18 is mounted on the holding ring 19 so that the sensor ring 17 rotates with the drive shaft 8. A sensor ring 20 corresponding to the driven sensor device 22 is mounted on the sensor shaft 16 and is fixed by a retaining ring 21. In this technical solution, the distance between the driving sensor device 18 and the sensor ring 17 and the distance between the driven sensor device 22 and the sensor ring 20 cannot be adjusted. The tolerance range of this distance can only be guaranteed by the dimensional tolerance of the related parts. However, the modular joint has many components and the dimensional chain is relatively complicated, the manufacturing cost will be increased if the distance between the sensor device and the sensor ring is ensured by controlling the tolerances of all corresponding parts, and it is not easy to adjust and control during assembly and debugging.

SUMMARY OF THE INVENTION

It is an object of the invention to solve at least one of problems of the prior art and provides a modular robot joint, including a motor, a reducer, a hollow shaft, an output flange, a brake, and the encoder, the hollow shaft is fixed to the output flange, the motor outputs power to the output flange through the reducer, the encoder is used to detect the rotation speed of the motor or to detect the rotation speed of the hollow shaft, and feedbacks information to the control system; the encoder includes a magnetic ring and a reading head, and the magnetic ring is fixed to a motor shaft of the motor or the hollow shaft, a reading head bracket is further provided, and the reading head bracket is provided with a reading head position adjustment mechanism, the reading head is disposed on the reading head position adjustment mechanism and is opposite to the magnetic ring, the axial distance between the reading head and the magnetic ring can be adjusted to a predetermined value by adjusting the reading head position adjustment mechanism.

Further, the reading head position adjustment mechanism includes a lower support and a upper support, the lower support and the upper support are connected to each other and positioned by a positioning connecting member, the upper support is pressed tightly against the lower support by a pressing connecting member, the reading head is fixed to the upper surface of the upper support.

Further, the reading head is fixed to the upper surface of the upper support by a reading head fixing member.

Further, the reading head fixing member is a reading head fixing screw.

Further, the positioning connecting member is a positioning screw.

Further, the pressing connecting member is a pressing screw.

Further, the encoder is a high-speed side encoder, the magnetic ring is a high-speed side magnetic ring, the reading head is a high-speed side reading head, and the reading head bracket is a high-speed side reading head bracket, the high-speed side reading head bracket is fixed to a brake housing.

Further, the positioning connecting members are divided into one group, two groups or more groups, and the pressing connecting members are divided into one group, two groups or more groups.

The invention also provides a encoder reading head position adjustment mechanism for modular robot joint, the encoder reading head position adjustment mechanism is disposed on one side of the encoder reading head bracket, and includes a lower support and a upper support, the lower support and the upper support are connected to each other and positioned by a positioning connecting member, the upper support is pressed tightly against the lower support by a pressing connecting member, the encoder reading head is fixed to the upper surface of the upper support and is opposite to the encoder magnetic ring, the encoder magnetic ring is fixed to the motor shaft or the hollow shaft, the distance between the lower support and the upper support can be adjusted by adjusting the pressing connecting member and positioning connecting member, so that the axial distance between the reading head and the magnetic ring can be adjusted to a predetermined value.

The invention also provides a method for adjusting the position of an encoder reading head of a modular robot joint, characterized by including the following steps:
  (1) a reading head position adjustment mechanism is provided, the reading head position adjustment mechanism is provided on a reading head bracket, the reading head position adjustment mechanism includes an upper support and a lower support, the upper support and the lower support are connected to each other and positioned by a positioning connecting member, the upper support is pressed tightly against the lower support by a pressing connecting member;
  (2) the reading head is set on a surface of a side of the upper support, and is opposite to the magnetic ring;
  (3) the axial distance between the reading head and the magnetic ring can be adjusted to a predetermined value by adjusting the pressing connecting member and positioning connecting member.

Further, the method further comprising the following steps:

when the axial distance between the reading head and the magnetic ring is greater than the predetermined value Ds, the following adjustment steps are performed:

S1: the positioning connecting member is rotated to move a certain distance upwardly;

S2: the pressing connecting member is rotated to move a certain distance downwardly;

combining or repeating the above steps S1 and S2 reasonably until the axial distance between the reading head of the encoder and the magnetic ring is equal to the predetermined value Ds;

when the axial distance between the reading head and surface of the magnetic ring is less than the predetermined value Ds; the following adjustment steps are performed:

S3: the positioning connecting member is rotated to move a certain distance downwardly;

S2: the pressing connecting member is rotated to move a certain distance upwardly;

combining or repeating the above steps S3 and S4 reasonably until the axial distance between the reading head of the encoder and the magnetic ring is equal to the predetermined value Ds.

Further, the method is used for an adjustment process of a modular robot joint after assembly.

The relative distance between the reading head and the magnetic ring in the axial direction can be adjusted in a convenient and flexible manner by installing the reading head position adjustment mechanism on the reading head bracket of the modular robot joint to ensure that the distance between the reading head and the magnetic ring meets the installation accuracy requirements, so that the encoder is more accurate, and the processing accuracy of related parts on the dimensional chain is reasonably reduced, and the processing cost is reduced too, and the relative distance between the reading head and the magnetic ring is easy to adjust when the robot joint is assembled and debugged, thus achieving good technical results.

BRIEF DESCRIPTION OF THE DRAWINGS

The above-mentioned and/or additional aspects and advantages of the present invention will become apparent and easily understood from the description of the embodiments with the following drawings, wherein:

FIG. 5(b) is a schematic view of a specific adjustment process of d<Ds of a read head position adjustment mechanism of a modular robot joint according to the first embodiment of the present invention.

Figure 1:
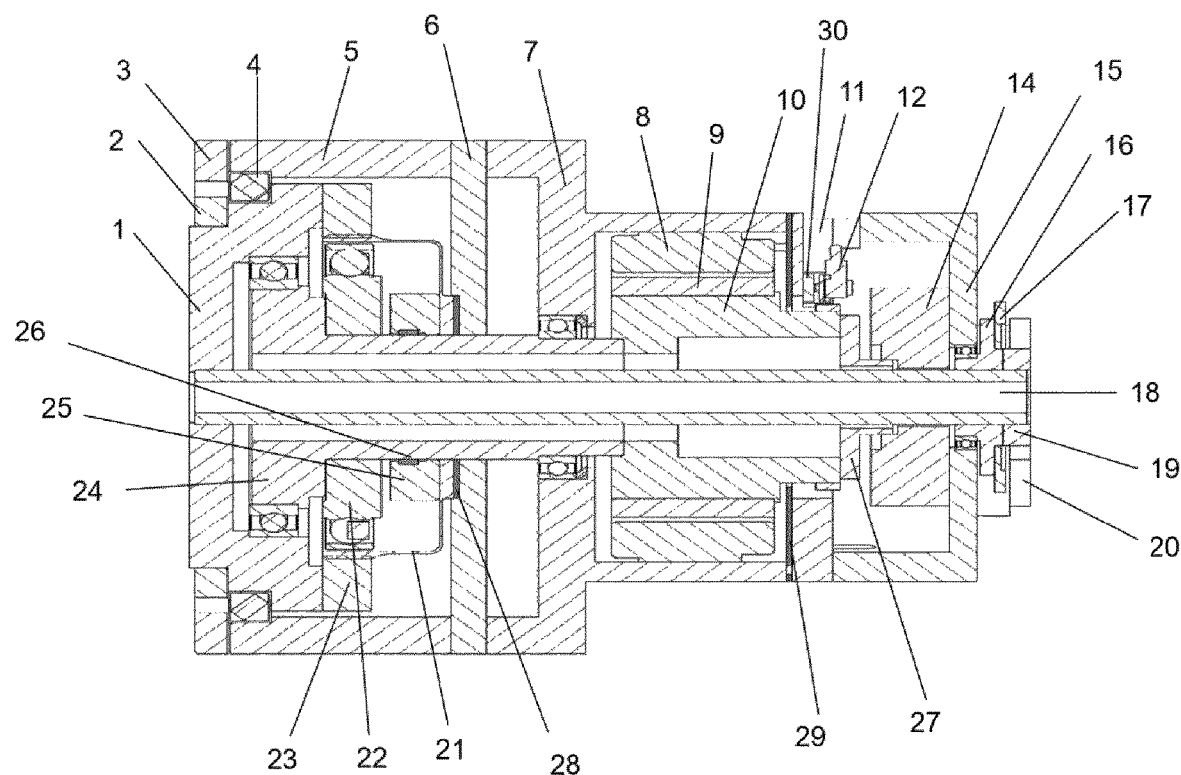
FIG. 1 is a schematic axial sectional view of a modular robot joint according to a first embodiment of the present invention.
Figure 2:
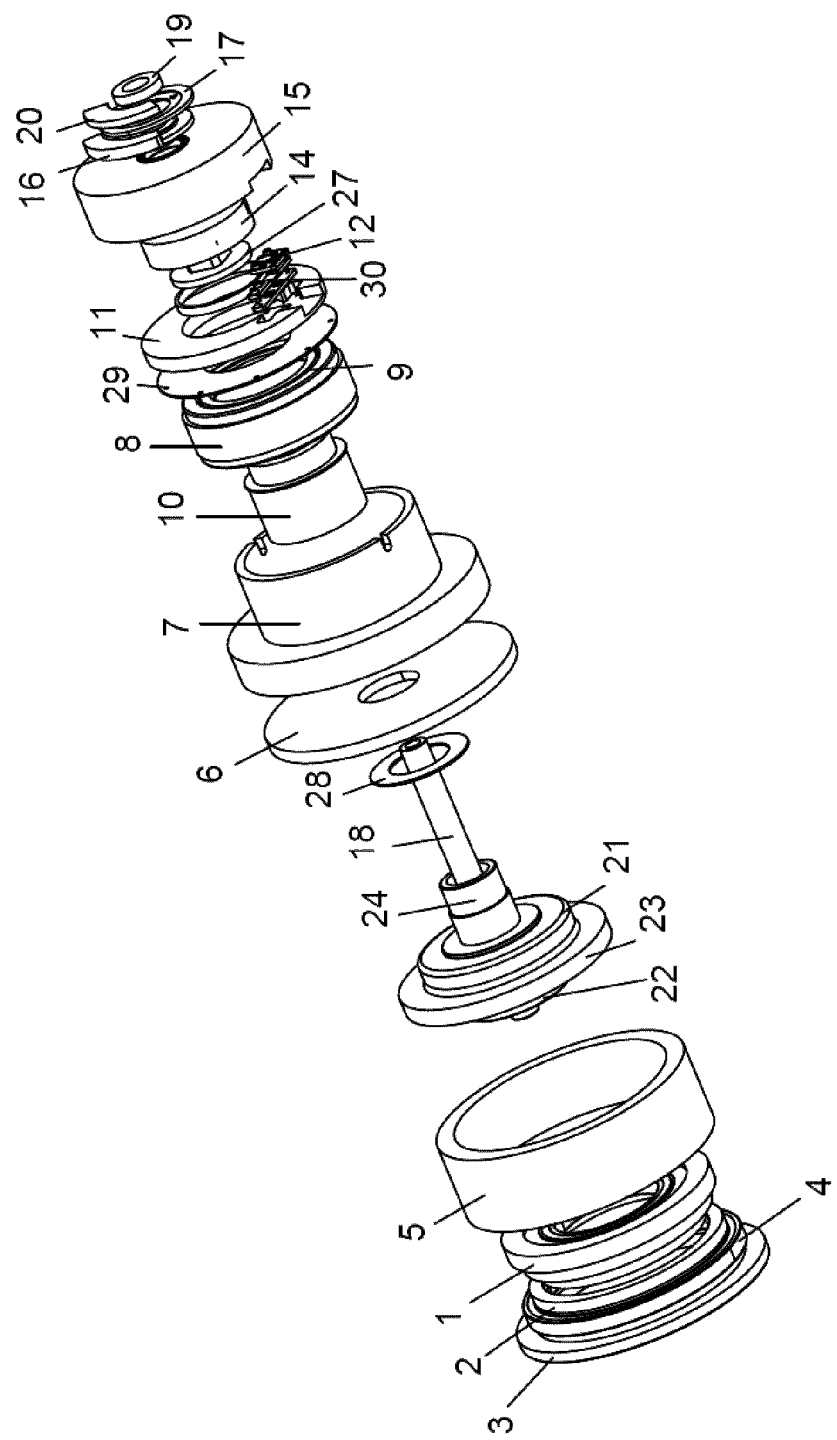
FIG. 2 is an exploded view of a modular robot joint according to the first embodiment of the present invention.

Wherein, 1—output flange; 2—bearing inner ring pressing plate; 3—bearing outer ring pressing plate; 4—cross roller bearing; 5—output end housing; 6—torque sensor; 7—motor housing; 8—motor stator; 9—motor rotor; 10—motor shaft; 11—high-speed side reading head bracket; 12—high-speed side reading head; 13—high-speed side magnetic ring; 14—brake; 15—brake housing; 16—low-speed side reading head bracket; 17—low-speed side magnetic ring; 18—hollow shaft; 19—hoop; 20—low-speed side reading head; 21—flexible wheel; 22—wave generator; 23—rigid wheel; 24—input shaft; 25—flexible wheel mounting plate; 26—seal ring; 27—rotor hub; 28—friction structure member; 29—magnetic shielding plate; 30—reading head position adjustment mechanism.

DETAILED DESCRIPTION OF THE PREFERRED EMBODIMENTS

Hereinafter, embodiments of the present invention will be described in detail. Examples of the embodiments are shown in the accompanying drawings, wherein the same or similar reference numerals refer to the same or similar elements or elements having the same or similar functions throughout. The embodiments described below with reference to the drawings are exemplary and are only used to explain the present invention, but should not be construed as limitation to the present invention.

In the description of the present invention, the terms like "vertical", "lateral", "up", "down", "front", "back", "left", "right", "vertical", "horizontal", "top", "bottom" and the like which indicate orientation or positional relationship indicate the orientation or positional relationship shown in the drawings, and the above-mentioned terms are used only to facilitate the description of the invention instead of requiring the present invention to be constructed and operated in a specific orientation. It cannot be understood as a limitation to the present invention.

In addition, in the description of the present invention, it should be noted that the terms like "installation", "connect", and "concatenate" should be construed in a broad way unless the meanings of above-mentioned terms are clear, for example, the above-mentioned terms can be a mechanical connection, or an electrical connection, or a direct connection, or indirect connection which is achieved by an intermediate medium, or an internal connection of two components. For the one skilled in the art, the specific meanings of the above terms in the present invention can be understood in accordance with specific conditions.

Further, it is understood that the description of any methods below, and a flowchart or the description of any process or method otherwise described herein indicate that they include module, fragment or part, which can execute instruction, including one or more steps for implementing a specific logical function or process, and the scope of a preferred embodiment of the present invention includes additional implementations, which may not be in the order shown or discussed, which should be understood by the one skilled in the art to which the embodiments of the present invention belong.

A logic and/or steps described in a flowchart or otherwise described herein, for example, can be a sequenced list of executable instructions that can be considered to implement a logical function, can be embodied in any computer-readable medium for using by an instruction execution system, equipment, or device (such as a computer-based system, a system including a processor, or other system that can fetch and execute instructions from an instruction execution system, equipment, or device), or for using with an instruction execution system, equipment, or device. A "computer-readable medium" may be any device that can contain, store, communicate, propagate, or transmit a program for using by an instruction execution system, apparatus, or device, or for using with an instruction execution system, apparatus, or device according to the invention. More specific examples (non-exhaustive list) of computer-readable media include the following: electrical connections (electronic devices) with one or more wirings, portable computer disk enclosures (magnetic devices), random access memory (RAM), read-only memory (ROM), erasable and editable read-only memory (EPROM or flash memory), fiber optic devices, and portable optical disk read-only memory (CDROM). In addition, the computer-readable medium may even be paper or other suitable medium on which the program can be printed, because, for example, the program can be obtained by optically scanning the paper or other medium, followed by editing, interpreting, or other suitable processing, and then stored in computer memory.

It should be understood that each part of the present invention may be implemented by hardware, software, firmware, or a combination thereof. In the above embodiments, multiple steps or methods may be implemented by software or firmware stored in a memory and executed by a suitable instruction execution system.

Embodiment 1

As shown in FIGS. 1-5, this embodiment discloses a modular robot joint, which includes a motor, a reducer, a hollow shaft 18, an output flange 1, a brake 14, and the like. Wherein, the motor includes a motor housing 7, a motor stator 8, a motor rotor 9, and a motor shaft 10. The reducer is a harmonic reducer, and the harmonic reducer includes a flexible wheel 21, a rigid wheel 23, and a wave generator 22. The hollow shaft 18 is fixed to the output flange 1. The motor outputs power to the output flange 1 through the reducer. The encoder includes a high-speed side encoder and a low-speed side encoder. The high-speed side encoder is used to detect the rotation speed of the motor, and the low-speed side encoder is used to detect the rotation speed of the hollow shaft 18, and feedback information to the control system.

The encoder includes a magnetic ring and a reading head, the magnetic ring is fixed to the motor shaft 10 of the motor or the hollow shaft 18, and a reading head bracket is further provided, and the reading head bracket is provided with a reading head position adjustment mechanism 30, the reading head is disposed on the reading head position adjustment mechanism 30 and is opposite to the magnetic ring, the axial distance between the reading head and the magnetic ring can be adjusted to a predetermined value by adjusting the reading head position adjustment mechanism.

Both the reading head of high-speed side encoder and the reading head of the low-speed side encoder can be adjusted by the reading head position adjustment mechanism. This embodiment takes a high-speed side encoder as an example, and specifically describes the principle and structure of adjusting position of the reading head by the reading head adjustment mechanism.

Figure 3:
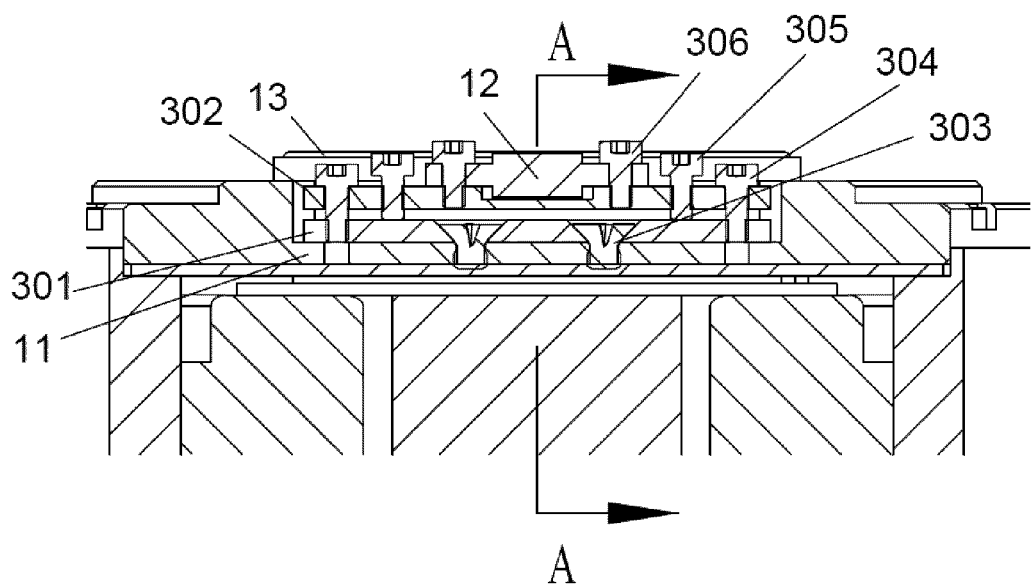
FIG. 3 is a detailed structural view of a reading head position adjustment mechanism of a modular robot joint according to the first embodiment of the present invention.
Figure 4:
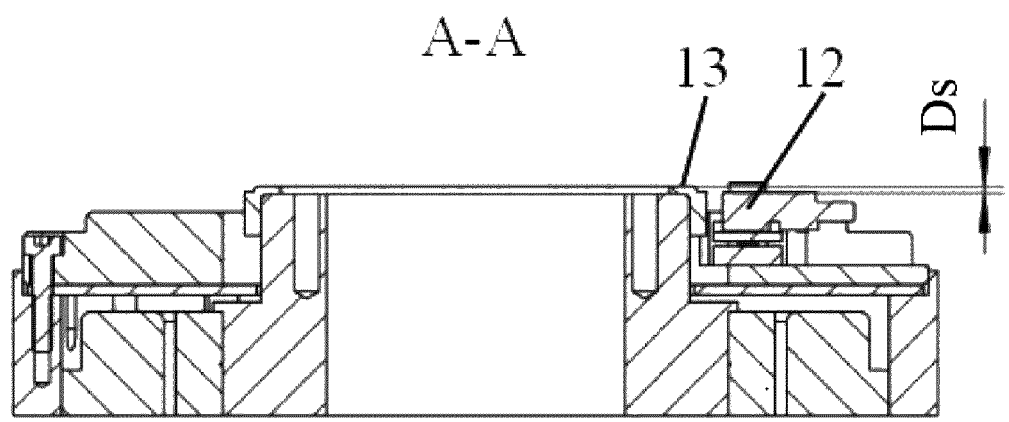
FIG. 4 is a schematic cross-sectional view taken along A-A in FIG. 3.
Figure 5:
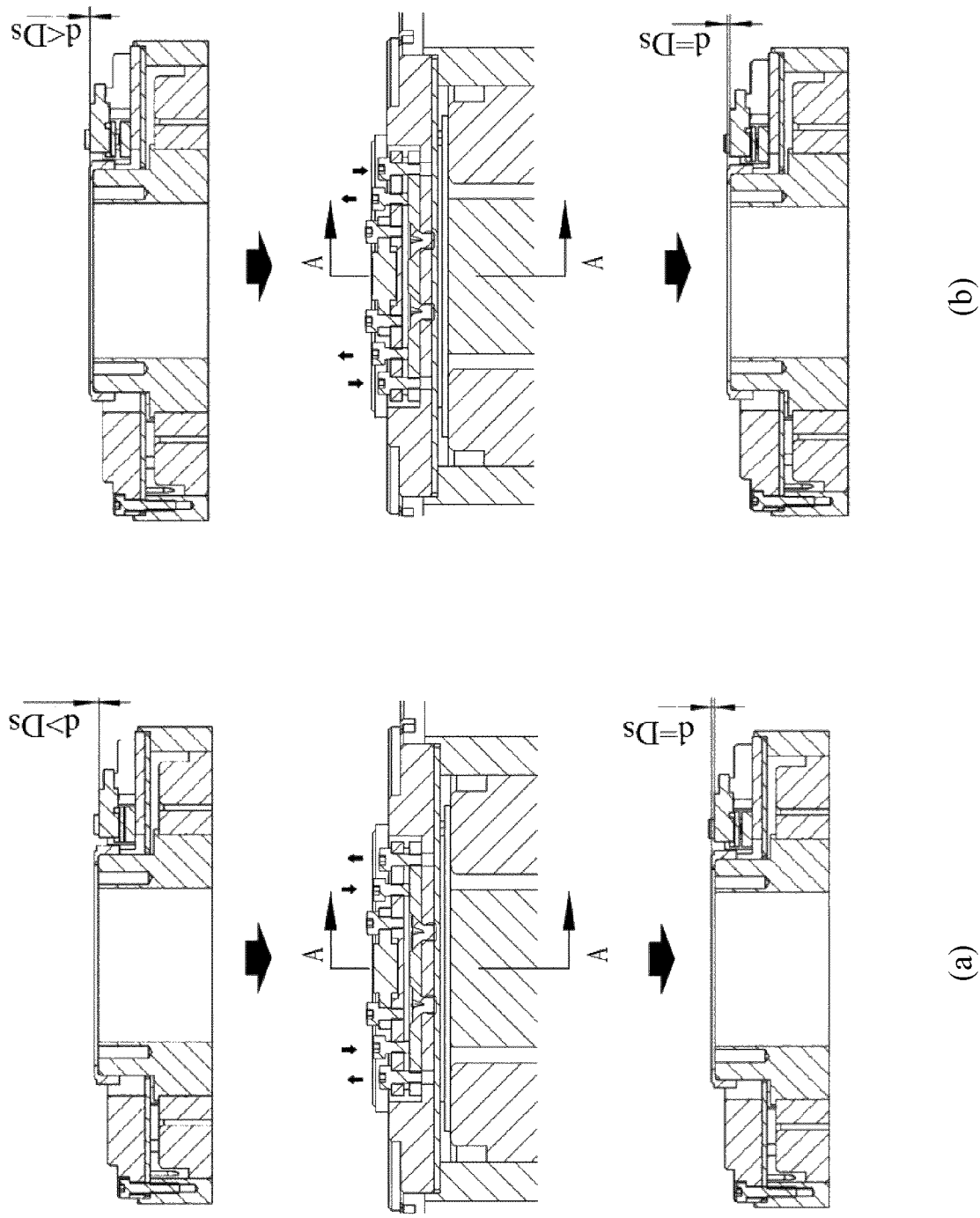
FIG. 5 (a) is a schematic view of a specific adjustment process of d>Ds of a read head position adjustment mechanism of a modular robot joint according to the first embodiment of the present invention.

As shown in FIGS. 3-5, the high-speed side encoder includes a high-speed side magnetic ring 13 and a high-speed side reading head 12. The reading head position adjustment mechanism 30 is disposed on a side of the high-speed side reading head bracket 11, and includes a lower support 301 and a upper support 302. The lower support 301 and the upper support 302 are connected to each other and positioned by a positioning connecting member, the upper support 302 is pressed tightly against the lower support 301 by a pressing connecting member, the high-speed side reading head 12 is fixed to the upper surface of the upper support 302.

Specifically, the positioning connecting member is a positioning screw 304, the pressing connecting member is a pressing screw 305, and the high-speed side reading head 12 is fixed to the upper surface of the upper support 302 by a reading head fixing member, and the reading head fixing member is specifically a reading head fixing screw 306.

Wherein, the high-speed side magnetic ring 13 is fixed on the motor shaft 10, and the high-speed side reading head bracket 11 is connected to the motor housing 7.

FIG. 5 is used to explain the working principle of the reading head position adjustment mechanism 30. The reading head position adjustment mechanism 30 is divided into two parts structurally, that is, a lower support 301 and a upper support 302, the lower support 301 is mounted on the high-speed side reading head bracket 11, and the high-speed side reading head 12 is mounted on the upper support 302. The distance between the upper support and lower support is ensured by the positioning screw 304, and the upper support is pressed tightly against the lower support by a pressing connecting member, the positioning screw passes through the through hole of the upper support 302 and cooperates with the screw hole of the lower support 301. The pressing screw 305 cooperates with the screw hole of the upper support 302 and press against the lower support 301.

The distance between the upper support 302 and the lower support 301 can be adjusted by adjusting the number of rotations of the positioning screw 304 and the pressing screw 305, thereby adjusting the axial distance between the high-speed side reading head and the high-speed side magnetic ring. Specifically, as shown in FIG. 5 (a), when the distance between the reading head and surface of the magnetic ring is greater than the recommended installation distance Ds after assembly, firstly, the positioning screw 304 is rotated to move a certain distance upwardly, and then, the pressing screw 305 is rotated to move a certain distance downwardly, thereby adjusting the distance d between the reading head and the surface of the magnetic ring to the recommended installation distance Ds. When the distance between the reading head and surface of the magnetic ring is less than the recommended installation distance Ds after assembly, as shown in FIG. 5 (b), firstly, the pressing screw 305 is rotated to move a certain distance upwardly, and then, the positioning screw 304 is rotated to move a certain distance downwardly, thereby adjusting the distance d between the reading head and the surface of the magnetic ring to the recommended installation distance Ds.

The positioning connecting members are specifically divided into one group, two groups or more groups, and the pressing connecting members are specifically divided into one group, two groups or more groups.

The relative distance between the high-speed side reading head and the high-speed side magnetic ring in the axial direction can be adjusted by installing the reading head position adjustment mechanism on the high-speed side reading head bracket of the modular robot joint to ensure the installation requirements, so that the encoder is more accurate, and the processing accuracy of related parts on the dimensional chain is reasonably reduced, and the processing cost is reduced too.

In addition, it should be noted that the motor stator 8 and the motor rotor 9 are connected to the motor housing 7 and the motor shaft 10, respectively. The motor shaft 10 is connected to the input shaft 24, and the motor shaft 10 and the input shaft 24 are supported by two bearings. The rotor hub 27 is fixed to the motor shaft 10. The brake housing 15 is fixed to the high-speed side reading head bracket 11. The brake 14 is fixed to a brake housing 15. The input shaft 24 is connected to a wave generator 22. A friction structural member 28 is provided between the flexible wheel 21 and the torque sensor 6, and the mating surface of the flexible wheel 21 and the mating surface of the torque sensor 6 simultaneously press tightly against the friction structural member 28. The torque sensor 6 is connected to the output end housing 5 and the motor housing 7. The rigid wheel 23 is connected to the output flange 1. The output flange 1 and the bearing inner ring pressure plate 2 press tightly against the inner ring of the cross roller bearing 4, and the output end housing 5 and the bearing outer ring pressure plate 3 press tightly against the outer ring of the cross roller bearing 4. The magnetic shielding plate 29 is mounted on a side of the high-speed side reading head bracket 11 close to the motor stator 8 and the motor rotor 9.

The low-speed side magnetic ring 17 and the hoop 19 are connected to the low-speed side magnetic ring bracket 16, and the hoop 19 is connected to the hollow shaft 18. The left side of the hollow shaft is connected to the output flange 1. The low-speed side magnetic ring bracket 16 is connected to the brake housing 15 through a bearing. The low-speed reading head is connected to the brake housing 15.

Embodiment 2

As shown in FIGS. 3-5, this embodiment discloses a encoder reading head position adjustment mechanism for modular robot joint. The encoder reading head position adjustment mechanism is disposed on one side of the encoder reading head bracket, and includes a lower support 301 and a upper support 302, the lower support 301 and the upper support 302 are connected to each other and positioned by a positioning connecting member, the upper support 302 is pressed tightly against the lower support 301 by a pressing connecting member, the encoder reading head is fixed to the upper surface of the upper support 302 and is opposite to the encoder magnetic ring. The encoder magnetic ring is fixed to the motor shaft 10 or the hollow shaft 18, the distance between the lower support 301 and the upper support 302 can be adjusted by adjusting the pressing connecting member and positioning connecting member, and thus, the axial distance between the reading head and the magnetic ring can be adjusted to a predetermined value.

Embodiment 3

This embodiment discloses a method for adjusting the position of an encoder reading head of a modular robot joint including the following steps:
(1) A reading head position adjustment mechanism is provided. The reading head position adjustment mechanism is provided on a reading head bracket. The reading head position adjustment mechanism includes an upper support and a lower support. The upper support and the lower support are connected to each other and positioned by a positioning connecting member, the upper support is pressed tightly against the lower support by a pressing connecting member;
(2) the reading head is set on a surface of a side of the upper support, and is opposite to the magnetic ring;
(3) the axial distance between the reading head and the magnetic ring can be adjusted to a predetermined value by adjusting the pressing connecting member and positioning connecting member.

Further, the method also includes the following steps:
When the axial distance between the reading head and the magnetic ring is greater than the predetermined value Ds, the following adjustment steps are performed:
S1: the positioning connecting member is rotated to move a certain distance upwardly;
S2: the pressing connecting member is rotated to move a certain distance downwardly;
Combining or repeating the above steps S1 and S2 reasonably until the axial distance between the reading head of the encoder and the magnetic ring is equal to the predetermined value Ds;
When the axial distance between the reading head and surface of the magnetic ring is less than the predetermined value Ds; the following adjustment steps are performed:
S3: the positioning connecting member is rotated to move a certain distance downwardly;
S2: the pressing connecting member is rotated to move a certain distance upwardly;
Combining or repeating the above steps S3 and S4 reasonably until the axial distance between the reading head of the encoder and the magnetic ring is equal to the predetermined value Ds;
This method is used for the adjustment process of a modular robot joint after assembly.

In the description of this specification, the terms "one embodiment", "some embodiments", "examples", "specific examples", or "some examples" and the like means specific features described in conjunction with the embodiments or examples, structure, materials or features are included in at least one embodiment or example of the present invention. In this specification, the schematic expressions of the above terms do not necessarily refer to the same embodiment or example. Moreover, the particular features, structures, materials, or characteristics described may be combined in any suitable manner in any one or more embodiments or examples. Although the embodiments of the present invention have been shown and described, those of ordinary skill in the art can understand that various changes, modifications, replacements, and substitutions of these embodiments can be made without departing from the principles and purposes of the present invention. The scope of the invention is defined by the claims and their equivalents.

What is claimed is:
1. A modular robot joint, including a motor, a reducer, a hollow shaft, an output flange, a brake, and an encoder, the hollow shaft is fixed to the output flange the motor outputs power to the output flange through the reducer, the encoder is used to detect the rotation speed of the motor or to detect the rotation speed of the hollow shaft, and feedbacks information to the control system, the encoder including:
a magnetic ring and a reading head, the magnetic ring fixed to a motor shaft of the motor or the hollow shaft; and
a reading head bracket, wherein the reading head bracket includes a reading head position adjustment mechanism disposed on one side of the reading head bracket, the reading head is disposed on the reading head position adjustment mechanism opposite to the magnetic ring, the axial distance between the reading head and the magnetic ring being selectively adjustable to a predetermined value by adjusting the reading head position adjustment mechanism;
the reading head position adjustment mechanism includes a lower support and an upper support, the lower support and the upper support connected to each other and positioned by a positioning screw, the upper support being pressed against the lower support by a pressing screw, the reading head being fixed to the upper surface of the upper support by a reading head fixing screw, wherein:

the reading head is set on a surface of a side of the upper support, opposite to the magnetic ring, and the axial distance between the reading head and a surface of the magnetic ring being selectively adjustable to a predetermined value Ds by adjusting the pressing screw and positioning screw, and wherein:

when the axial distance between the reading head and the surface of the magnetic ring is greater than the predetermined value Ds, at least one of S1: the positioning screw is selectively rotated to move a certain distance upwardly, and S2: the pressing screw is selectively rotated to move a certain distance downwardly, until the axial distance between the reading head of the encoder and the magnetic ring is equal to the predetermined value Ds;

when the axial distance between the reading head and surface of the magnetic ring is less than the predetermined value Ds, at least one of S3: the positioning screw is selectively to move a certain distance downwardly, and S4: the pressing screw is selectively rotated to move a certain distance upwardly, until the axial distance between the reading head of the encoder and the surface of the magnetic ring is equal to the predetermined value Ds.

2. The modular robot joint according to claim 1, wherein the axial distance is configured to be adjusted after assembly of the modular robot joint.

\* \* \* \* \*